US010699357B2

(12) United States Patent
Komiyama

(10) Patent No.: US 10,699,357 B2
(45) Date of Patent: *Jun. 30, 2020

(54) INFORMATION PROCESSING SYSTEM, PROCESSING APPARATUS, INFORMATION PROCESSING METHOD, AND PROGRAM

(71) Applicant: NS SOLUTIONS CORPORATION, Tokyo (JP)

(72) Inventor: Masakazu Komiyama, Tokyo (JP)

(73) Assignee: NS SOLUTIONS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/764,235

(22) PCT Filed: Jun. 23, 2017

(86) PCT No.: PCT/JP2017/023265
§ 371 (c)(1),
(2) Date: Mar. 28, 2018

(87) PCT Pub. No.: WO2018/003712
PCT Pub. Date: Jan. 4, 2018

(65) Prior Publication Data
US 2019/0108605 A1  Apr. 11, 2019

(30) Foreign Application Priority Data
Jun. 28, 2016 (JP) .................. 2016-127234

(51) Int. Cl.
*G06Q 50/28* (2012.01)
*G06Q 10/08* (2012.01)
(Continued)

(52) U.S. Cl.
CPC .......... *G06Q 50/28* (2013.01); *B65G 1/1371* (2013.01); *B66F 9/0755* (2013.01); *B66F 9/24* (2013.01); *G06Q 10/087* (2013.01); *H04N 7/183* (2013.01)

(58) Field of Classification Search
CPC ....... G06Q 50/28; H04N 7/183; B65G 1/1371
(Continued)

(56) References Cited

U.S. PATENT DOCUMENTS

2007/0229238 A1* 10/2007 Boyles ............... G06K 9/00369
340/435
2013/0096713 A1   4/2013 Takizawa et al.
(Continued)

FOREIGN PATENT DOCUMENTS

JP   S63-22500 A   1/1988
JP   2004-196439 A   7/2004
(Continued)

OTHER PUBLICATIONS

Canadian Office Action of related Canadian Application No. 3,000,129 dated Nov. 28, 2018.
(Continued)

*Primary Examiner* — On S Mung
(74) *Attorney, Agent, or Firm* — Arent Fox LLP

(57) ABSTRACT

An information processing system according to an aspect of the disclosure includes a movable moving body; a photographing device provided on the moving body; and an information processing device. The photographing device includes: a photographer for continuous photographing; and a transmitter for transmitting photographed images. The information processing device includes: a receiver to receive the photographed images; a specifier to specify articles and storage units in which the article is able to be stored from the photographed images; a selector to select a combination of the storage unit and the article stored in the storage unit based on the articles and the storage units which are specified by the specifier; and a memory to store, in a memory device, information indicating the storage unit and information indicating the article, the storage unit and the article which are contained in the combination selected by the selector, in association with each other.

12 Claims, 5 Drawing Sheets

(51) Int. Cl.
  *B66F 9/075* (2006.01)
  *B66F 9/24* (2006.01)
  *B65G 1/137* (2006.01)
  *H04N 7/18* (2006.01)

(58) Field of Classification Search
  USPC .......................................................... 348/148
  See application file for complete search history.

(56) References Cited

U.S. PATENT DOCUMENTS

2015/0032252 A1  1/2015  Galluzzo et al.
2016/0379159 A1  12/2016  Yasunaga

FOREIGN PATENT DOCUMENTS

| JP | 2011-084384 A | 4/2011 |
| JP | 4739580 B2 | 8/2011 |
| JP | 2015-124023 A | 7/2015 |
| JP | 2016-222371 A | 12/2016 |
| JP | 2017-007861 A | 1/2017 |
| JP | 2017-097622 A | 6/2017 |

OTHER PUBLICATIONS

Translation of the International Preliminary Report on Patentability for related International Application No. PCT/JP2017/023265 dated Jan. 1, 2019.
Japanese Office Action of related Patent Application No. 2016-127234 dated Apr. 27, 2017.
Notice of Allowance of related Japanese Patent Application No. 2016-127234 dated Oct. 19, 2017.

* cited by examiner

INFORMATION PROCESSING SYSTEM, PROCESSING APPARATUS, INFORMATION PROCESSING METHOD, AND PROGRAM

CROSS-REFERENCE TO RELATED APPLICATIONS

This application is a National Stage entry of International Application No. PCT/JP2017/023265, filed Jun. 23, 2017, which claims priority to Japanese Patent Application No, 2016-127234, filed Jun. 28, 2016. The disclosures of the priority applications are incorporated in their entirety herein by reference.

TECHNICAL FIELD

The present invention relates to an information processing system, an information processing apparatus, an information processing method, and a program.

BACKGROUND ART

As a technique relating to the management of articles in a warehouse, Patent Literature 1 discloses the following storage and retrieval management system. The storage and retrieval management system in Patent Literature 1 includes: a forklift; an in-warehouse database; a control device; and first and second photographing devices that photograph images. The forklift conveys a cargo-loaded pallet. In the in-warehouse database, storage and retrieval information for managing storage locations of cargoes are stored. The control device performs storage and retrieval management of cargoes. The first photographing device is provided at the top of a doorway of a warehouse through which the forklift passes. The second photographing device is provided on the forklift or at each location in the warehouse. When the forklift laden with a cargo-loaded pallet enters the warehouse, the first photographing device photographs a first image containing a name of the cargo loaded on the pallet and a forklift ID displayed on the forklift. When the forklift places the cargo-loaded pallet at a predetermined location in the warehouse, the second photographing device photographs a second image containing a location ID displayed at the location and the forklift ID. The control device checks the name of the cargo photographed in the first image, the location ID photographed in the second image, and the storage and retrieval information stored in the in-warehouse database based on the forklift ID photographed in the first and second images. Then, it judges whether the cargo matching the storage and retrieval information has been disposed at the location matching the storage and retrieval information.

CITATION LIST

Patent Literature

Patent Literature 1: Japanese Patent No. 4739580

SUMMARY OF INVENTION

Technical Problem

However, even when the storage and retrieval management system in Patent Literature 1 is used, there is sometimes a case that a worker has carried an article to a wrong place, or has carried out an article that should not be carried out. In such a case, it becomes difficult to manage articles in a warehouse. In the technique of Patent Literature 1, an alarm is output repeatedly until the article is placed at a correct place, but a case where the worker ignores the alarms to carry the article to a wrong place is not considered.

An object of the present invention is to enable management of articles in a warehouse even when a worker has erroneously performed carrying-in or carrying-out of an article.

Solution to Problem

An information processing system according to the present invention is an information processing system including: a movable moving body; a photographing device provided on the moving body; and an information processing apparatus, in which the photographing device includes: a photographer configured to perform continuous photographing; and a transmitter configured to transmit photographed images photographed by the photographer, and the information processing apparatus includes: a receiver configured to receive the photographed images; a specifier configured to specify articles and storage units in which the article is able to be stored from the photographed images received by the receiver; a selector configured to select a combination of the storage unit and the article stored in the storage unit based on the articles and the storage units which are specified by the specifier; and a memory configured to store, in a memory device, information indicating the storage unit and information indicating the article, the storage unit and the article which are contained in the combination selected by the selector, in association with each other.

Advantageous Effects of Invention

According to the present invention, it is possible to manage articles in a warehouse even when a worker has erroneously performed carrying-in or carrying-out of an article.

DESCRIPTION OF EMBODIMENTS

Figure 1:
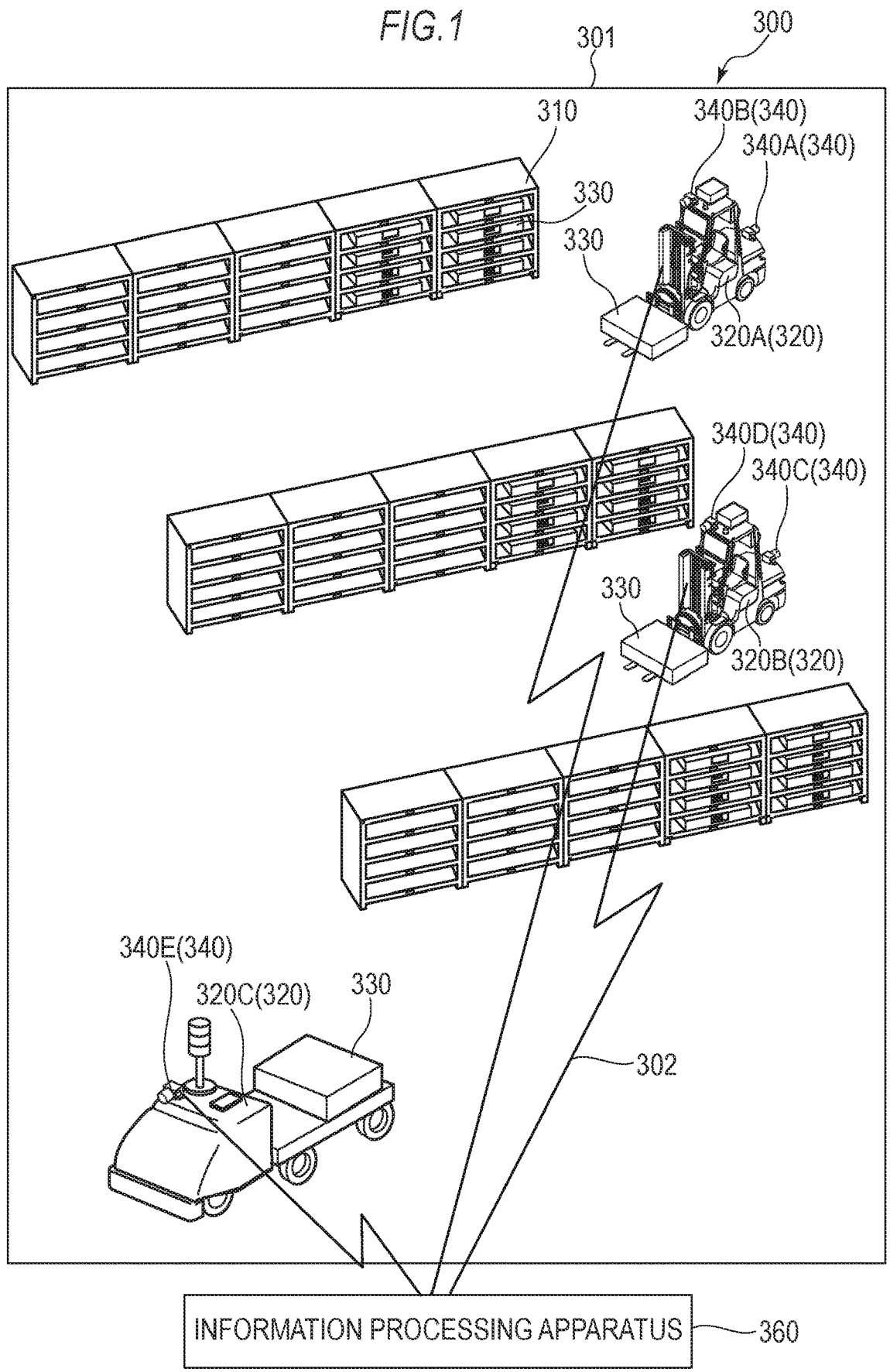
FIG. 1 is a view illustrating one example of a configuration of an article management system.

Hereinafter, there will be explained embodiments according to the present invention based on the drawings.

[Overall Configuration of an Article Management System]

First, there will be explained an overall configuration of an article management system 300 according to a first embodiment with reference to FIG. 1. The article management system 300 is a system that manages articles 330 to be stored in a warehouse 301, and includes: shelves 310; conveyors 320; photographing devices 340; and an information processing apparatus 360. The article management system 300 is one example of an information processing system.

Figure 2:
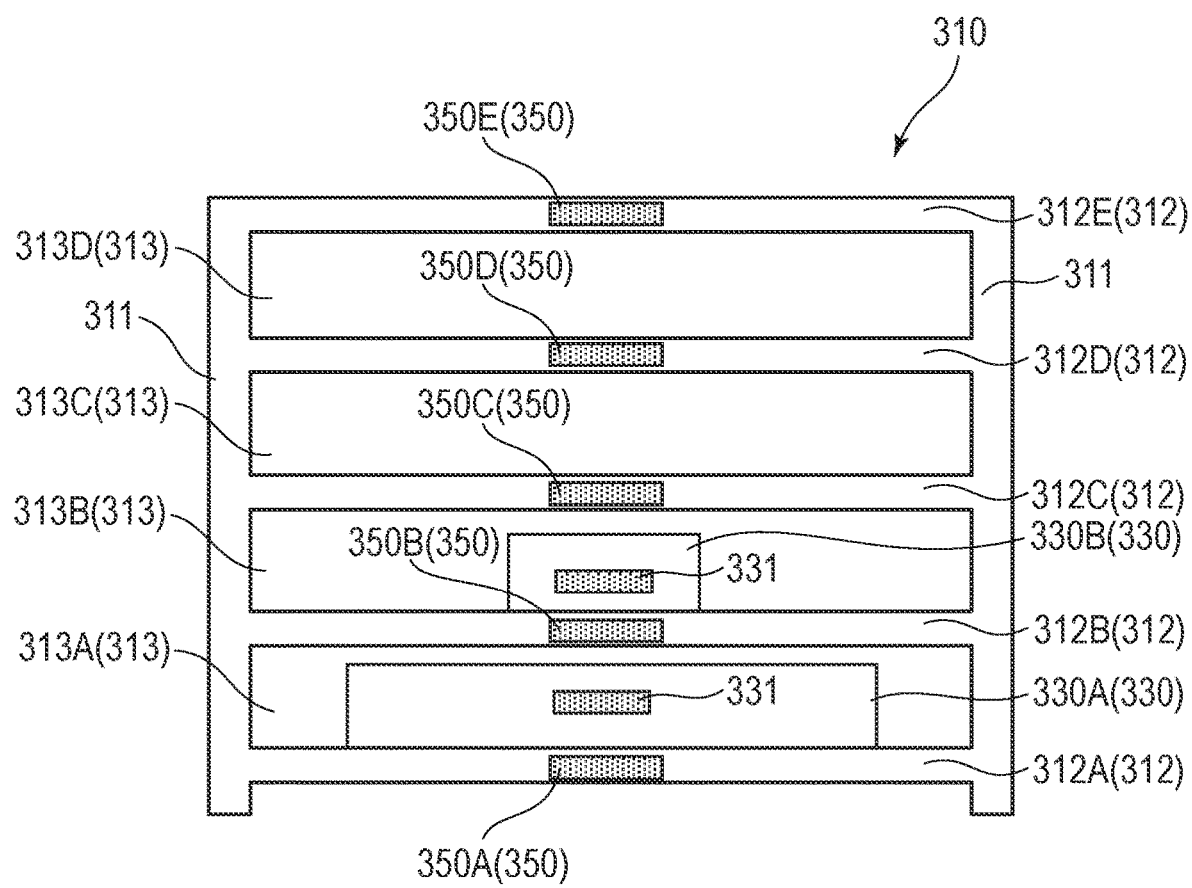
FIG. 2 is a front view of a shelf.

The plural shelves 310 each being one example of a storage unit, are disposed in the warehouse 301, where the articles 330 can be stored. Here, the shelf 310 will be explained with reference to FIG. 2. FIG. 2 is a front view of the shelf 310. The shelf 310 includes: a pair of sidewalls 311; and a plurality of shelf plates 312. The paired sidewalls 311 are disposed to extend in the vertical direction. Each of the shelf plates 312 is a partition member of the shelf 310, and has end portions thereof bonded to the paired sidewalls 311 so as to make a main surface thereof horizontal. The shelf 310 illustrated in FIG. 2 includes five shelf plates 312, which are a first shelf plate 312A to a fifth shelf plate 312E in order from the bottom. The uppermost fifth shelf plate 312E becomes a top plate of the shelf 310. The four shelf plates 312 being the first shelf plate 312A to the fourth shelf plate 312D become a first stage to a fourth stage of the shelf 310 respectively. The region surrounded by the shelf plates 312 and the sidewalls 311 becomes a storage space 313 for the articles 330 at each stage of the shelf 310. That is, the inside of the shelf 310 is partitioned by the shelf plates 312 to form the storage spaces 313. For example, a region surrounded by the first shelf plate 312A and the second shelf plate 312B and the paired sidewalls 311 becomes a storage space 313A at the first stage of the shelf 310. Similarly, a storage space 313B at the second stage to a storage space 313D at the fourth stage of the shelf 310 are formed. Incidentally, the number of stages of the shelf 310 is not limited to four, and the shelf 310 may have a first stage to a third stage, or five stages or more.

Figure 3:
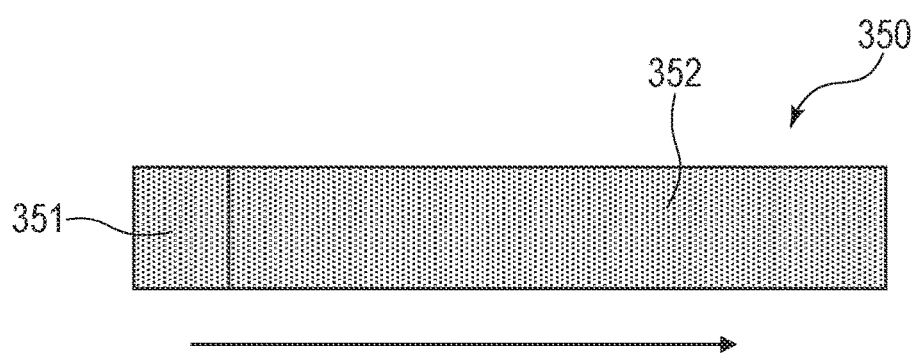
FIG. 3 is a view illustrating one example of a marker.

Markers 350 are attached to the front of the shelf 310. Here, the marker 350 will be explained with reference to FIG. 3. FIG. 3 is a view of the marker 350. The marker 350 is an optical readable type, in which preset information is stored. The information contained in the marker 350 can be acquired by analyzing and reading image data obtained by photographing the marker 350. The marker 350 contains a first region 351 and a second region 352. The first region 351 is a region to be a reading start position of the marker 350. The reading start position is a position to be a datum when reading the information from the marker 350, and is defined by a preset symbol or color. In the second region 352, the information stored in the marker 350 is stored. The information stored in the marker 350 is read while being analyzed in the order progressing in a direction from the first region 351 to be the reading start position to the second region 352 (the arrow direction in FIG. 3).

The marker 350 of the shelf 310 is attached to a middle portion in the horizontal direction on the front of each of the shelf plates 312. One marker 350 is attached to each one shelf plate 312. For the markers 350, for example, a QR code (registered trademark) or color bits (registered trademark) are used, but ones other than these may be used.

In each of the markers 350 on the shelf 310, a shelf ID and a storage space ID are stored. The shelf ID is information indicating the shelf 310, and is an identifier peculiar to each shelf 310. The storage space ID is information indicating the storage space 313, and is an identifier peculiar to each storage space 313.

In this embodiment, it is set that in each of the markers 350 on the shelf 310, the storage space ID of the upper storage space 313 on the shelf plate 312 with each marker 350 attached thereto is stored. For example, in a first marker 350A, a storage space ID indicating information of an upper first storage space 313A on the first shelf plate 312A with the first marker 350A attached thereto is stored. A fifth marker 350E attached to the shelf plate 312E to be a top plate is set that information indicating that the shelf plate 312E is the top plate of the shelf 310 is stored therein as the storage space ID. The shelf ID is stored also in the fifth marker 350E, and thus specification of the shelf plate 312 is enabled also from the fifth marker 350E.

The article 330 can be stored on each of the stages of the shelf 310. In the example in FIG. 2, an article 330A is placed on the first shelf plate 312A being the first stage. On the second shelf plate 312B being the second stage, a second article 330B is placed. On each of the third shelf plate 312C being the third stage and the fourth shelf plate 312D being the fourth stage, the article 330 is not placed.

A marker 331 is attached to each of the articles 330 on the front side of the shelf 310. The marker 331 of the article 330 is formed in the same manner as the marker 350 explained with reference to FIG. 3. The article ID is stored in the marker 331 of the article 330. The article ID is information indicating the article 330, and is an identifier peculiar to each article 330.

The explanation of the article management system 300 will be continued returning to FIG. 1.

The conveyor 320 is an example of the movable moving body, and can convey the article 330. Three conveyors 320 are used in the article management system 300. A first conveyor 320A and a second conveyor 320B each are a forklift, and store the article 330 in the shelf 310 of the warehouse 301 and take the article 330 out of the shelf 310. A third conveyor 320C conveys the article 330 placed on the third conveyor 320C by the forklift, for example, to a preset place. The number of the conveyors 320 to be used in the article management system 300 is not limited to three.

The photographing device 340 can photograph images and transmit a photographed image to the information processing apparatus 360 via a network 302. The photographing device 340 is provided on the conveyor 320. Therefore, the photographing device 340 moves in the warehouse 301 together with the conveyor 320. The photographing device 340 continues photographing unless otherwise instructed and continues transmitting a photographed image to the information processing apparatus 360. Incidentally, the network 302 is set to a radio communication network, but may be a wired network.

Two photographing devices being a first photographing device 340A and a second photographing device 340B are provided on the first conveyor 320A. The first photographing device 340A is provided at a rear portion of the first conveyor 320A to direct its photographing direction to the rear of the first conveyor 320A. The second photographing device 340B is provided on a head guard that becomes a roof of the first conveyor 320A to direct its photographing direction to the front of the first conveyor 320A.

Similarly to the first conveyor 320A, on the second conveyor 320B as well, a third photographing device 340C is provided at its rear portion and a fourth photographing device 340D is provided on its head guard.

A single photographing device 340E is provided on the third conveyor 320C.

Three or more photographing devices 340 may be provided on the conveyor 320. Further, the photographing direction of the photographing device 340 is not limited to the directions explained here, but may be the right, the left, or the like of the conveyor 320, for example. Further, the article management system 300 may include a conveyor 320 without the photographing device 340 provided thereon.

The information processing apparatus 360 receives the photographed images from the photographing devices 340 to analyze them, to thereby update information of places where the articles 330 are stored. Details of processing by the information processing apparatus 360 will be described later.

[Hardware Configuration]

Figure 4:
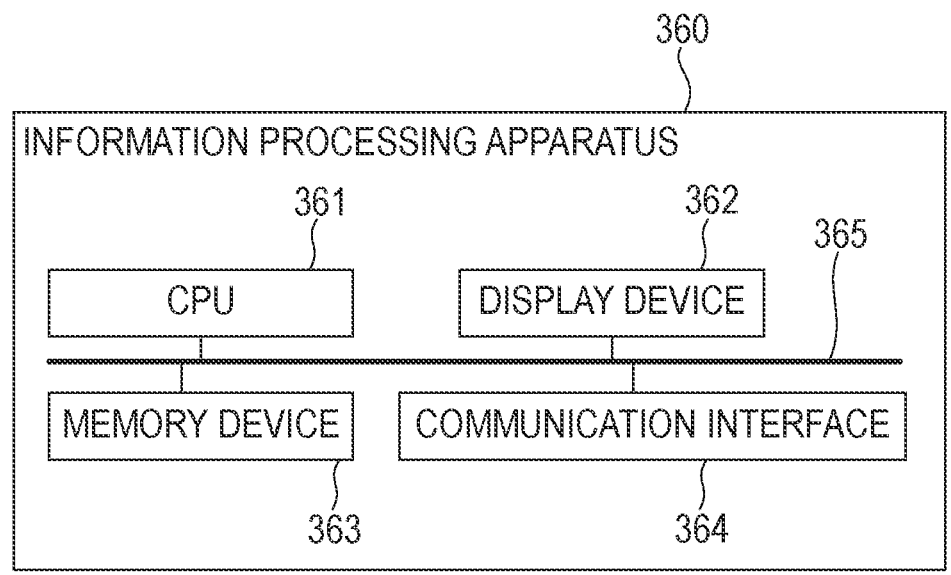
FIG. 4 is a diagram illustrating one example of a hardware configuration of an information processing apparatus.

Next, there will be explained a hardware configuration of the information processing apparatus 360 with reference to FIG. 4. FIG. 4 is a hardware configuration diagram of the information processing apparatus 360. The information processing apparatus 360 includes: a CPU 361; a display device 362; a memory device 363; a communication interface 364; and a bus 365 connecting these as hardware.

Figure 5:
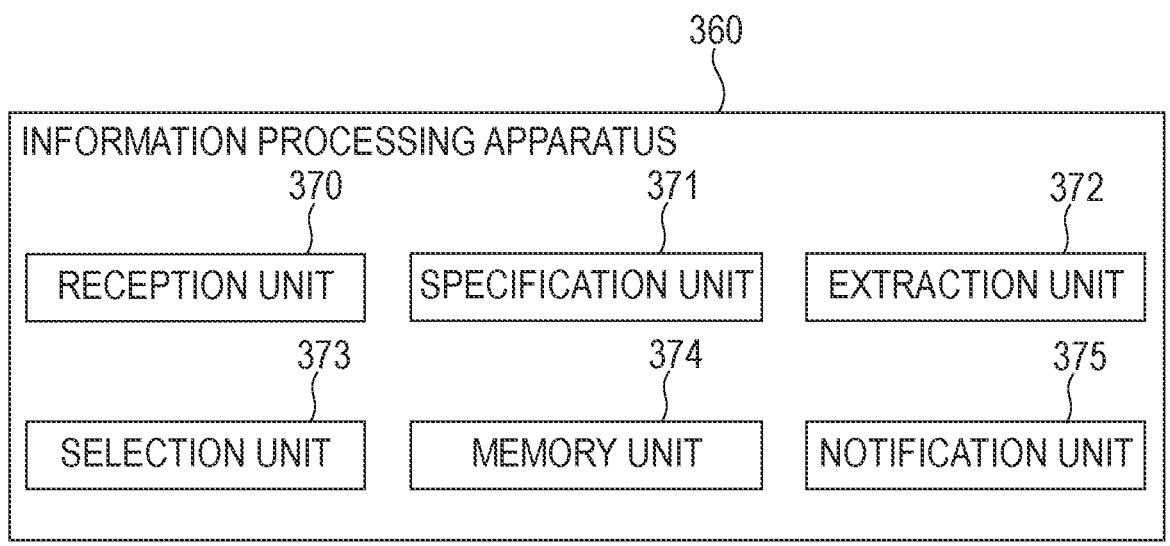
FIG. 5 is a diagram illustrating one example of a software configuration of the information processing apparatus.
Figure 6:
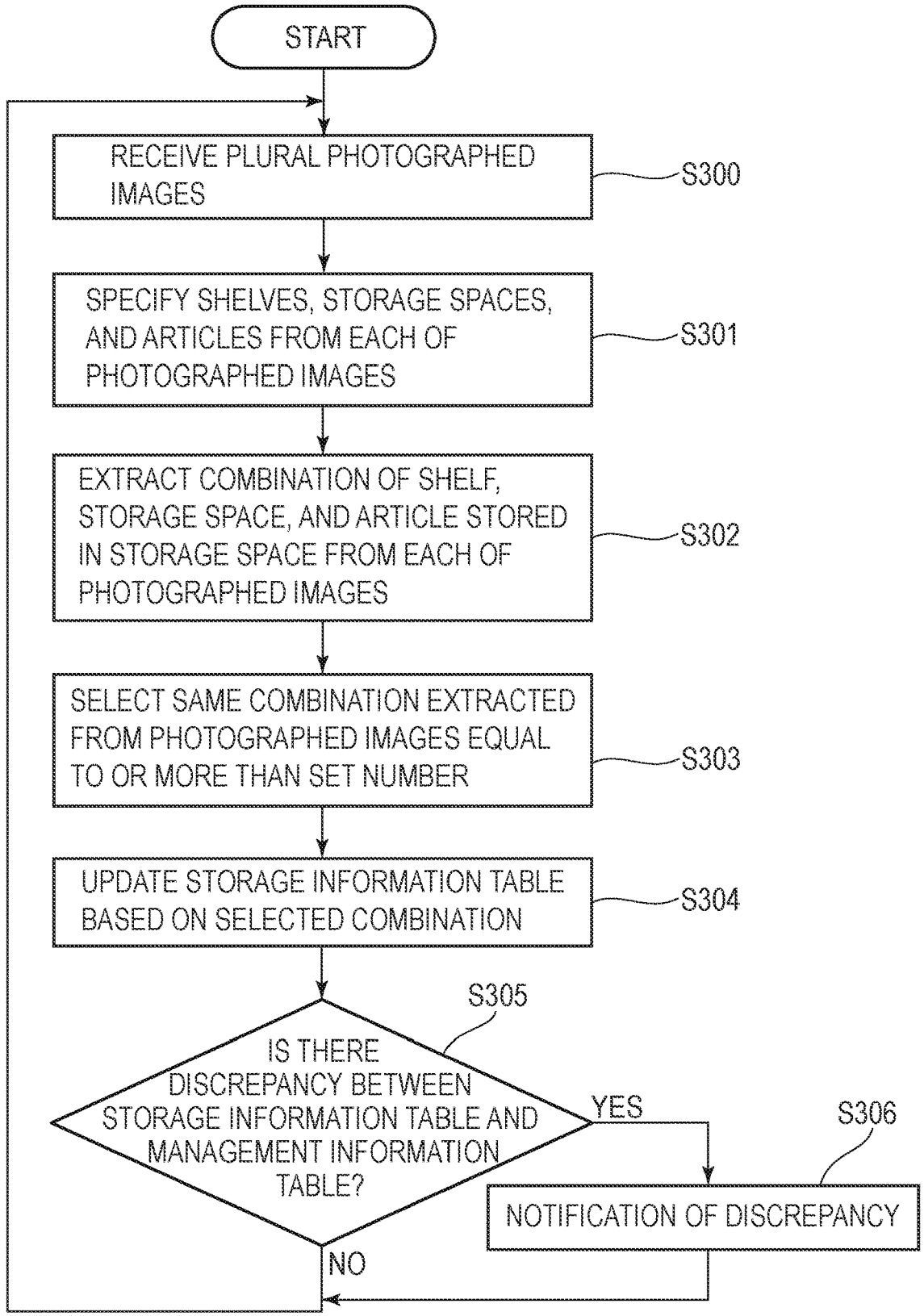
FIG. 6 is a flowchart illustrating one example of database update processing.

The CPU 361 controls the entire information processing apparatus 360. The CPU 361 executes processing based on programs stored in the memory device 363 or the like, and thereby functions of the information processing apparatus 360 illustrated in FIG. 5 and later-described processing of a flowchart in FIG. 6 are performed.

The display device 362 is a liquid crystal monitor or the like, and can display an image.

The memory device 363 is a memory device such as a RAM, a ROM, or a HDD, and stores programs and stores data or the like to be used when the CPU 361 executes processing based on the programs. Further, the memory device 363 stores a storage information table and a management information table. The memory device 363 is one example of a storage medium that stores programs.

The storage information table stores the shelf ID, the storage space ID, and the article ID in association with one another. In the storage information table, the shelf ID, the storage space ID in the shelf 310 indicated by the shelf ID, and the article ID corresponding to the article 330 stored in the storage space 313 indicated by this storage space ID are associated with one another. The storage information table represents a current state of the warehouse 301. The storage information table is kept updating by database update processing illustrated in FIG. 6.

The management information table stores the shelf ID, the storage space ID, and the article ID in association with one another. In the management information table, the shelf ID, the storage space ID in the shelf 310 indicated by the shelf ID, and the article ID corresponding to the article 330 that is supposed to be stored in the storage space 313 indicated by this storage space ID are associated with one another. Therefore, the management information table represents a target state of the warehouse 301, namely represents an ideal state of the warehouse 301. The management information table is updated by a manager of the article management system 300, for example.

The communication interface 364 manages controls of communication between the information processing apparatus 360 and an external device such as the photographing device 340.

Next, there will be explained a hardware configuration of the photographing device 340. The photographing device 340 includes: a CPU; a memory device; an image sensor; a communication interface; and a bus connecting these as hardware.

The CPU of the photographing device 340 controls the entire photographing device 340. The CPU of the photographing device 340 executes processing based on programs stored in the memory device or the like of the photographing device 340, and thereby functions of the photographing device 340 are performed.

The memory device of the photographing device 340 is a memory device such as a RAM, a ROM, or a HDD, and stores programs and stores data or the like to be used when the CPU of the photographing device 340 executes processing based on the programs.

The image sensor of the photographing device 340 is used when the photographing device 340 photographs, and generates a digital image from light that has passed through a lens.

The communication interface of the photographing device 340 manages controls of communication between the photographing device 340 and an external device such as the information processing apparatus 360.

[Software Configuration]

Next, there will be explained a software configuration of the information processing apparatus 360 with reference to FIG. 5. FIG. 5 is a software configuration diagram of the information processing apparatus 360. The information processing apparatus 360 includes: a reception unit 370; a specification unit 371; an extraction unit 372; a selection unit 373; a memory unit 374; and a notification unit 375 as software.

The reception unit 370 receives the photographed images transmitted by a transmission unit of the photographing device 340 via the communication interface 364. Photographed images are sometimes transmitted from the plural photographing devices 340, and the reception unit 370 receives all the photographed images.

The specification unit 371 specifies the shelves 310, the storage spaces 313, and the articles 330 from the photographed images received by the reception unit 370.

The extraction unit 372 extracts, based on the shelves 310, the storage spaces 313, and the articles 330 that are specified by the specification unit 371, a combination of the shelf 310, the storage space 313 of the shelf 310, and the article 330 stored in the storage space 313 every photographed image. In the information processing apparatus 360, the combination of the shelf 310, the storage space 313, and the article 330 is expressed by combination information. The combination information is information composed of the shelf ID, the storage space ID, and the article ID.

The selection unit 373 selects a combination of the shelf 310, the storage space 313 of the shelf 310, and the article 330 stored in the storage space 313 based on the shelves 310, the storage spaces 313, and the articles 330 that are specified by the specification unit 371. More specifically, the selection unit 373 selects the same combination extracted by the extraction unit 372 from the photographed images that are equal to or more than a set proportion to a preset number of the photographed images.

The memory unit 374 stores the shelf ID of the shelf 310, the storage unit ID of the storage space 313, and the article ID of the article 330 that are contained in the combination selected by the selection unit 373, in the storage information table in the memory device 363 in association with one another.

The notification unit 375 notifies, when there is a discrepancy between information stored in the storage information table and information stored in the management information table, a manager or the like of the article management system 300 of information regarding this discrepancy.

Next, there will be explained a software configuration of the photographing device 340. The photographing device 340 includes: a photographing unit; and the transmission unit as software.

The photographing unit of the photographing device 340 performs continuous photographing using the image sensor or the like of the photographing device 340 at a set frame rate and continues generating a photographed image.

The transmission unit 347 of the photographing device 340 transmits the photographed images generated by the photographing unit of the photographing device 340 to the information processing apparatus 360 via the communication interface of the photographing device 340. The transmission unit 347 of the photographing device 340 continues transmitting the photographed image while the photographing unit 346 of the photographing device 340 performing continuous photographing.

[Database Update Processing]

Next, with reference to FIG. 6, there will be explained the database update processing to be performed by the information processing apparatus 360. FIG. 6 is a flowchart illustrating one example of the database update processing.

In S300, the reception unit 370 receives a plurality of photographed images from the photographing device 340. In this embodiment, the reception unit 370 receives the photographed images from the photographing device 340 during a set period of time. The article management system 330 includes the plural photographing devices 340 as described above, and thus the reception unit 370 receives the photographed images from the plural photographing devices 340 during the set period of time.

In S301, the specification unit 371 specifies the shelves 310, the storage spaces 313, and the articles 330 every photographed image from the photographed images received in S300. The specification unit 371 specifies the article 330 from the photographed image by reading the article ID of the article 330 from the marker 331 of the article 330 photographed in the photographed image. Further, the specification unit 371 specifies the shelf 310 and the storage space 313 by reading the shelf ID and the storage space ID from the marker 350 of the shelf 310 photographed in the photographed image. Although details will be described later, in the invention of the present application, the relationship between the storage space 313 and the article 330 is judged by utilizing the fact that the marker 331 of the article 330 and the marker 350 of the shelf 310 are simultaneously photographed in the photographed image.

Figure 7:
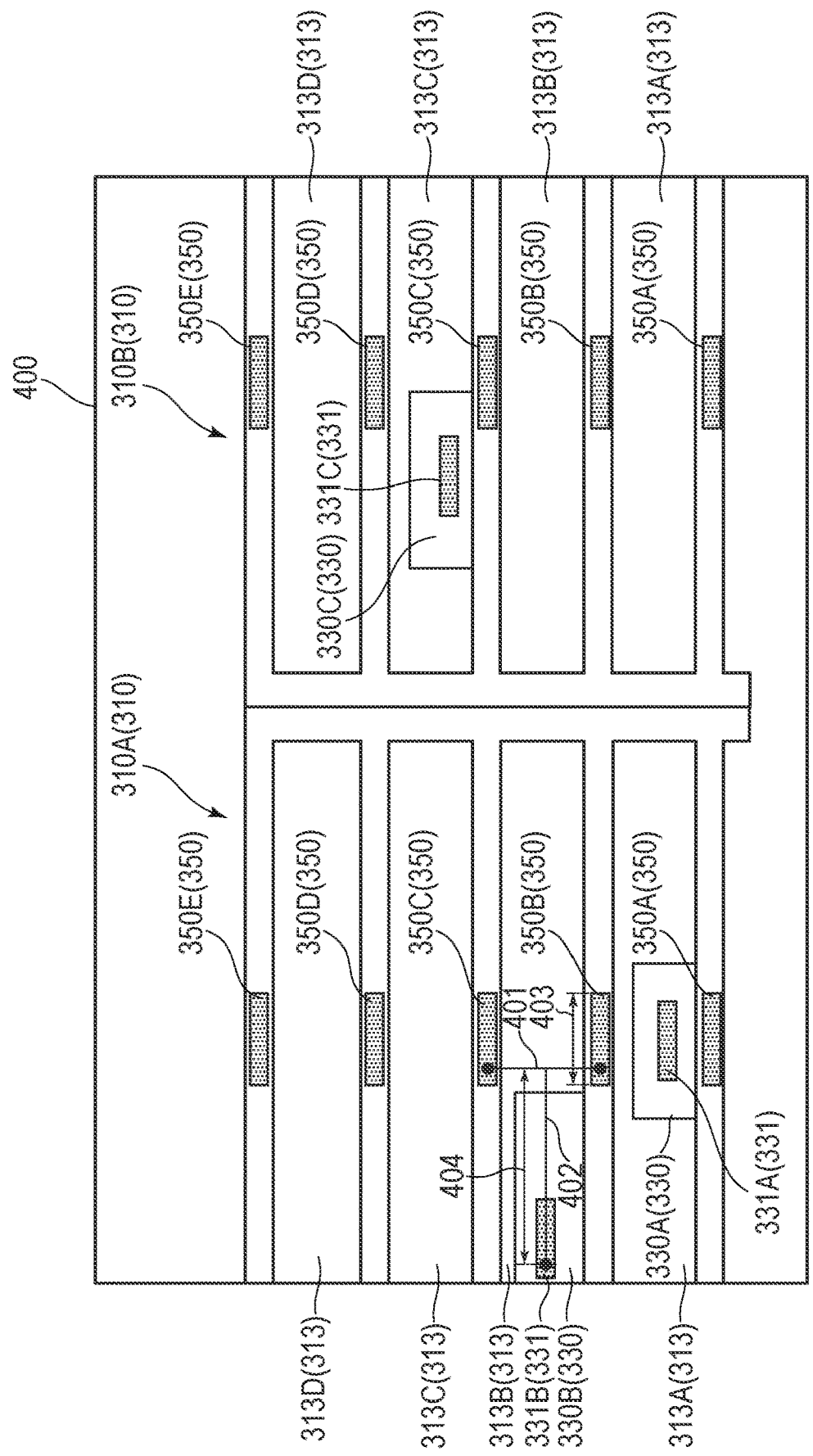
FIG. 7 is a view illustrating one example of a photographed image.

Here, with reference to FIG. 7, there will be explained an example of specifications of the shelf 310, the storage space 313, and the article 330 that are performed by the specification unit 371. FIG. 7 is a view illustrating one example of a photographed image 400.

In the photographed image 400, three markers 331 of articles 330 are photographed. The specification unit 371 reads these markers 331, to thereby specify the articles 330.

Further, in the photographed image 400, 10 markers 350 of shelves 310 are photographed. The specification unit 371 reads these markers 350, to thereby specify the shelves 310 and storage spaces 313. For example, the specification unit 371 reads a shelf ID and a storage space ID from a first marker 350A of a first shelf 310A, to thereby specify the first shelf 310A corresponding to the shelf ID and specify a first storage space 313A corresponding to the storage space ID. The specification unit 371 specifies the first shelf 310A and a second storage space 313B to a fourth storage space 313D based on a second marker 350B to a fourth marker 350D of the first shelf 310A similarly. Further, the specification unit 371 specifies a second shelf 310B and a first storage space 313A to a fourth storage space 313D of the second shelf 310B based on a first marker 350A to a fourth marker 350D of the second shelf 310B.

In S302, the extraction unit 372 extracts a combination of the shelf 310, the storage space 313 of the shelf 310, and the article 330 stored in the storage space 313 every photographed image based on the specification in S301. At this time, the extraction unit 372 extracts the combination of the shelf 310, the storage space 313 of the shelf 310, and the article 330 stored in the storage space 313 according to the following two judgments.

The first judgment is a judgment based on the position of the marker 350 of the shelf 310 and the position of the marker 331 of the article 330, which are photographed in the photographed image. The first judgment is performed as follows.

First, the extraction unit 372 selects a single marker 350 indicating an arbitrary storage space 313. This marker 350 is called a reference marker. In the example of FIG. 7, the extraction unit 372 selects the second marker 350B indicating the second storage space 313B, for example, as the reference marker.

Next, the extraction unit 372 selects a marker 350 that faces the reference marker across the storage space 313 indicated by the reference marker. This marker is called an end marker. In the example of FIG. 7, in the case of the second marker 350B being set as the reference marker, the extraction unit 372 selects the third marker 350C as the end marker. When there is no end marker, the extraction unit 372 finishes the first judgment regarding the reference marker that the extraction unit have selected most recently, and does not perform the second judgment.

Next, the extraction unit 372 judges whether, when drawing a virtual line, which is vertical to a reference line segment being a line segment connecting the position of the reference marker and the position of the end marker, from the position of the marker 331 of the article 330, this virtual line crosses the reference line segment. When they are crossed, the extraction unit 372 judges the article 330 indicated by the marker 331, which is the origin of this virtual line, as a candidate for the article 330 stored in the storage space 313 indicated by the reference marker.

In the example of FIG. 7, a line segment 401 connecting the position of the second marker 350B being the reference marker and the position of the third marker 350C being the end marker is the reference line segment.

When a virtual line vertical to the line segment 401 is drawn from a marker 331A of a first article 330A, this virtual line does not cross the line segment 401. Similarly, when a virtual line vertical to the line segment 401 is drawn from a marker 331C of a third article 330C, this virtual line does not cross the line segment 401. Accordingly, the first article 330A and the third article 330C do not become a candidate for the article 330 to be stored in the second storage space 313B.

In the meantime, when a virtual line 402 vertical to the line segment 401 is drawn from a marker 331B of a second article 330B, the virtual line 402 crosses the line segment 401. Accordingly, the second article 330B becomes a candidate for the article 330 to be stored in the second storage space 313B.

The extraction unit 372 performs the first judgment explained here using all the markers 350 of the shelves 310 as the reference marker.

The second judgment is a judgment based on the size of the marker 350 of the shelf 310 photographed in the photographed image and the distance between the marker 331 of the article 330 and the marker 350 of the shelf 310 that are photographed in the photographed image. The second judgment is performed as follows.

First, the extraction unit 372 acquires the width size of the reference marker in the photographed image by a pixel number, for example. The width is in a direction vertical to the reference line segment, for example. In the example of FIG. 7, a width 403 of the second marker 350B being the reference marker is acquired by a pixel number.

Next, the extraction unit 372 acquires, in the photographed image, a judgment distance being the distance from the position of the article 330 that has become the candidate in the first judgment to the position of the reference marker by a pixel number, for example. The position of the article 330 is set to the position of the marker 331 of the article 330. The positions of the markers 331, 350 are represented by the position of the first region 351 illustrated in FIG. 3, for example. The judgment distance is set to a distance in the width direction here, namely a distance in a direction vertical to the reference line segment. In the example of FIG. 7, a judgment distance 404 in the width direction from the marker 331B of the second article 330B to the second marker 350B being the reference marker is acquired.

Next, when the width size of the reference marker is equal to or more than a set proportion to the judgment distance, the extraction unit 372 judges that the article 330 that has become the candidate in the first judgment has been stored in the storage space 313 of the shelf 310 indicated by the reference marker. In the example of FIG. 7, when the width 403 is equal to or more than a set proportion to the judgment distance 404, the extraction unit 372 judges that the second article 330B has been stored in the second storage space 313B.

When it was not judged in the first judgment and the second judgment that there is the article 330 stored in the storage space 313 corresponding to the reference marker, the extraction unit 372 may judge that there is no article 330 in the storage space 313 corresponding to the reference marker. At this time, the extraction unit 372 gives information indicating that the article 330 does not exist to information indicating the combination of the shelf 310, the storage space 313 of the shelf 310, and the article 330 stored in the storage space 313.

In S303, the selection unit 373 selects the same combination extracted in S302 most recently from the photographed images that are equal to or more than a set number of the plural photographed images received in S300 most recently. The combination selected here is the one extracted at a constant frequency by the extraction unit 372 out of the combinations of the shelf 310, the storage space 313 of the shelf 310, and the article 330 stored in the storage space 313, and is said to be highly reliable.

The selection unit 373 selects the combination of the shelf 310, the storage space 313, and the article 330 as follows, for example.

The selection unit 373 selects the same combination extracted by the extraction unit 372 from the photographed images that are equal to or more than a set proportion to the plural photographed images received in S300 most recently.

Further, the selection unit 373 may perform the following processing on each of the combinations of the shelf 310, the storage space 313, and the article 330 extracted in S302 to select the combination.

First, the selection unit 373 selects photographed images in which at least one of the shelf 310, the storage space 313, and the article 330, which are contained in the combination to be subjected to processing, is photographed. These photographed images are the photographed images received by the reception unit 370 in S300 most recently.

Next, when the extraction unit 372 extracts the same combination as the combination to be subjected to processing from the photographed images that are equal to or more than a set proportion to the selected photographed images, the selection unit 373 selects the combination to be subjected to processing as the same combination extracted in S303 most recently from the photographed images that are equal to or more than a set number of the plural photographed images received in S300 most recently.

In S304, the memory unit 374 updates the storage information table based on the combination of the article 330, the storage space 313, and the article 330 that is selected in S303 most recently. That is, the memory unit 374 stores the shelf ID of the shelf 310, the storage space ID of the storage space 313, and the article ID of the article 330 that are contained in the combination selected in S303 most recently in the storage information table in association with one another.

When the shelf ID of the shelf 310, the storage space ID of the storage space 313, and the article ID of the article 330 that are contained in the combination selected in S303 most recently have not been stored in the storage information table in association with one another, the memory unit 374 may store this shelf ID, this storage space ID, and this article ID in the storage information table in association with one another.

In S305, the notification unit 375 detects the discrepancy between the information stored in the storage information table and the information stored in the management information table. At this time, the notification unit 375 may compare only the shelf ID, the storage space ID, and the storage unit ID that are updated in S304 most recently. The notification unit 375 advances the processing to S306 when detecting the discrepancy, and returns the processing to S300 when not detecting the discrepancy.

In S306, the notification unit 375 notifies the manager or the like of the article management system 300 of information regarding the discrepancy detected in S305 most recently. The information regarding the discrepancy detected in S305 most recently is the shelf ID, the storage space ID, and the article ID from which the discrepancy has been detected, for example. The notification unit 375 notifies the manager or the like by displaying the information regarding the discrepancy detected in S305 most recently on the display device 362. The notification unit 375 notifies the manager or the like and then returns the processing to S300.

In this manner, the processing returning to S300 is performed repeatedly after the processing of S305 or S306, and thereby the storage information table is repeatedly updated with the latest information one after another based on the photographed images photographed continuously by the photographing device 340.

[Effect]

As explained above, the photographing device 340 provided on the conveyor 320 performs continuous photographing to transmit photographed images to the information processing apparatus 360. The specification unit 371 specifies the shelves 310 and the articles 330 from the photographed images received from the photographing device 340. The selection unit 373 selects a combination of the shelf 310 and the article 330 stored in the shelf 310 based on the shelves 310 and the articles 330 that are specified by the specification unit 371. The memory unit 374 stores the shelf ID of the shelf 310 and the article ID of the article 330 of the combination selected by the selection unit 373 in the storage information table.

Thus, the storage information table stores information close to real time of the warehouse 301 based on the latest information. Accordingly, even when a worker has erroneously performed carrying-in or carrying-out of the article 330, the management of the articles 330 in the warehouse is enabled. Further, even by a warehouse management method in what is called a free location system in which places where articles are placed are not determined beforehand, the photographing device 340 captures the article 330 that has been placed appropriately in a vacant space, and thereby the shelf ID and the article ID are automatically stored in the storage information table in association with each other. Accordingly, it is no longer necessary to read the shelf ID and the article ID one by one individually by a scanner.

Further, carrying-in or carrying-out of the article 330 is sometimes performed by using a conveyor such as a forklift without the photographing device 340 provided thereon. Even in this case, the photographing device 340 provided on another conveyor 320 photographs the shelf 310, thereby making it possible to reflect the result of carrying-in or carrying-out by the conveyor without the photographing device 340 provided thereon in the storage information table. Accordingly, even when the carrying-in or carrying-out of the article 330 is performed by a conveyor such as a forklift without the photographing device 340 provided thereon, the management of the articles 330 in the warehouse is enabled.

Further, the specification unit 371 specifies the shelves 310 and the articles 330 from the photographed images received from the photographing device 340. Accordingly, it is possible to perform the processing of specifying the shelf 310 and the article 330 by the information processing apparatus 360 at a faster speed.

Further, as illustrated in FIG. 1, the first conveyor 320A and the second conveyor 320B each are a forklift. Further, the first photographing device 340A and the third photographing device 340C are provided at the rear portions of the first conveyor 320A and the second conveyor 320B respectively to direct their photographing directions to the rear of the first conveyor 320A and the second conveyor 320B. Accordingly, it is possible to reduce the risk that the first photographing device 340A and the second photographing device 340B photograph an image in which the shelf 310, the article 330, or the like is not photographed due to a mast or a fork of the forklift.

Further, the selection unit 373 selects the combination of the shelf 310, the storage space 313 of the shelf 310, and the article 330 stored in the storage space 313 based on the specification by the specification unit 371. The memory unit 374 stores the shelf ID of the shelf 310, the storage space ID of the storage space 313, and the article ID of the article 330 of the combination selected by the selection unit 373 in the storage information table in association with one another. Accordingly, it is possible to manage in which storage space 313 of which shelf 310 the article 330 has been stored in the article management system 300.

Further, the selection unit 373 selects the same combination extracted by the extraction unit 372 from the photographed images that are equal to or more than a set proportion to the plural photographed images. This combination is a combination containing the shelf 310 and the article 330 stored in the shelf 310.

Therefore, even in the case where there is a photographed image in which the marker 350 of the shelf 310 or the marker 331 of the article 330 is not photographed because of being hidden behind an object or the like, the information processing apparatus 360 can select the shelf 310 and the article 330 stored in the shelf 310 in the case where the marker 350 of the shelf 310 or the like is photographed in a certain number or more of the photographed images. Accordingly, the accuracy of the information to be stored in the storage information table improves.

Further, when there is a discrepancy between the information stored in the storage information table and the information stored in the management information table, the notification unit 375 notifies a manager or the like of the article management system 300 of that effect. Accordingly, the manager or the like of the article management system 300 can recognize that there is the article 330 that is not stored in the warehouse 301 correctly or the like.

Another Embodiment

In the above-described embodiment, in S300 in FIG. 6, the reception unit 370 receives the photographed images from the photographing device 340 during a set period of time, and based on these received photographed images, the subsequent processings from S301 to S304 are performed, and then the storage information table is updated.

However, in S300 in FIG. 6, it is also possible for the reception unit 370 to receive photographed images photographed by the photographing unit of the photographing device 340 during a set period of time, and based on these photographed images, the subsequent processings from S301 to S304 are performed. At this time, it is also possible that the reception unit 370 receives photographed images from the photographing device 340 during a set period of time, and from the received photographed images, the photographed images photographed by the photographing unit of the photographing device 340 are selected during a set period of time. Based on these selected photographed images, the subsequent processings from S301 to S304 are performed, and then the storage information table is updated.

Further, the storage information table does not store the shelf ID, the storage space ID, and the article ID in association with one another, but may store the shelf ID and the article ID in association with each other without storing the storage space ID. This makes it possible to save a memory capacity of the memory device 363.

At this time, the specification unit 371 may specify only the shelf 310 and the article ID. The extraction unit 372 extracts a combination of the shelf 310 and the article 330 stored in the shelf 310 every photographed image based on the specification by the specification unit 371. The selection unit 373 selects a combination of the shelf 310 and the article 330 stored in the shelf 310 based on the shelves 310 and the articles 330 specified by the specification unit 371. The extraction unit 372 can extract a combination of the shelf 310 and the article 330 stored in the shelf 310 every photographed image by processing similar to that in S302 in FIG. 6 from the lowermost marker 350 and the uppermost marker 350 of the shelf 310. The lowermost marker 350 of the shelf 310 is the marker 350 indicating the first storage space 313A, and the uppermost marker 350 of the shelf 310 is the marker 350 indicating the shelf plate 312 to be a top plate. This makes it possible to reduce a load of the processing by the information processing apparatus 360.

Further, the photographing device 340 may have a position information acquisition unit. The position information acquisition unit acquires position information of the photographing device 340. The position information acquisition unit is, for example, a GPS (global positioning system) module and receives a signal from a GPS satellite to acquire position information of the photographing device 340. The transmission unit of the photographing device 340, when transmitting the photographed image to the information processing apparatus 360, transmits the position information acquired by the position information acquisition unit thereto together.

The memory unit 374 of the information processing apparatus 360, when updating the storage information table, stores the position information of the photographing device 340 when photographing the marker 350 in which the shelf ID has been stored, in the storage information table together with the shelf ID and the like.

This makes it possible to grasp the approximate position of the shelf 310 by referring to the storage information table even in the case where the shelf 31 has been moved in the warehouse 301.

In the foregoing, the preferred embodiments of the present invention have been described in detail, but the present invention should not be limited to the specific embodiments and various alternation and modification are possible within a range of the scope of the present invention that is disclosed in the claims. For example, the above-described embodiments may be combined arbitrarily and implemented.

Incidentally, the photographing device 340 and the information processing apparatus 360 each are one example of a computer.

The invention claimed is:

1. A system comprising:
a photographing device provided on a moving body; and
an information processing device,
wherein the photographing device comprises:
a photographer configured to perform continuous photographing; and
a transmitter configured to transmit photographed images photographed by the photographer, and
the information processing device comprises:
a receiver configured to receive the photographed images;
with respect to each of the photographed images received by the receiver, a specifier configured to specify articles and storage units in which each article is able to be stored based on a marker of the storage unit and a marker of the article which are contemporaneously photographed in the photographed image;
an extractor configured to extract a combination of the storage unit and the article stored in the storage unit every photographed image based on the articles and the storage units which are specified by the specifier;
a selector configured to select a combination of the storage unit and the article extracted by the extractor from the photographed images that are equal to or more than a set proportion to a plurality of the set photographed images stored in the storage unit based on the articles and the storage units; and
a memory configured to store, in a memory device, information indicating the storage unit and information indicating the article, the storage unit and the article which are contained in the combination selected by the selector, in association with each other.

2. The system according to claim 1, wherein when information indicating the storage unit and information indicating the article, the storage unit and the article which are contained in the combination selected by the selector, are not stored in the memory device in association with each other, the memory stores, in the memory device, the information indicating the storage unit and the information indicating the article, the storage unit and the article which are contained in the combination, in association with each other.

3. The system according to claim 1, wherein the moving body is a forklift, and the photographing device is provided at a rear portion of the forklift to direct a photographing direction of the photographer to the rear of the forklift.

4. The system according to claim 1, wherein the storage unit is a shelf,
the specifier specifies shelves, storage spaces each formed by an inside of the shelf being partitioned by partition members, and the articles from the photographed images received by the receiver,
the selector selects a combination of the shelf, the storage space of the shelf, and the article stored in the storage space based on the shelves, the storage spaces, and the articles which are specified by the specifier, and
the memory stores, in the memory device, information indicating the shelf, information indicating the storage space, and information indicating the article, the shelf, the storage space, and the article which are contained in the combination selected by the selector, in association with one another.

5. The system according to claim 1, wherein a plurality of the set photographed images are a plurality of the photographed images received by the receiver during a set period of time, or a plurality of the photographed images photographed by the photographer during the set period of time.

6. The system according to claim 1 wherein the extractor extracts the combination of the storage unit and the article stored in the storage unit based on at least a size of the marker of the storage unit photographed in the photographed image and a distance between the marker of the article and the marker of the storage unit, the marker of the article and the marker of the storage unit which are photographed in the photographed image.

7. The system according to claim 1, wherein the extractor extracts the combination of the storage unit and the article stored in the storage unit based on at least a position of the marker of the storage unit photographed in the photographed image and a position of the marker of the article photographed in the photographed image.

8. The system according to claim 1, further comprising:
a notifier configured to perform, when there is a discrepancy between information stored by the memory and information in which the storage unit and the article that is supposed to be stored in the storage unit are associated with each other, notification of information regarding the discrepancy.

9. The system according to claim 8, further comprising:
a display device, wherein
the notifier displays the information regarding the discrepancy on the display device.

10. An information processing device, comprising:
a receiver configured to receive photographed images;
with respect to each of the photographed images received by the receiver, a specifier configured to specify articles and storage units in which the article is able to be stored based on a marker of the storage unit and a marker of the article which are contemporaneously photographed in the photographed image;
an extractor configured to extract a combination of the storage unit and the article stored in the storage unit every photographed image based on the articles and the storage units which are specified by the specifier;
a selector configured to select a combination of the storage unit and the article extracted by the extractor from the photographed images that are equal to or more than a set proportion to a plurality of the set photographed images stored in the storage unit based on the articles and the storage units; and a memory configured to store, in a memory device, information indicating the storage unit and information indicating the article stored in the storage unit, the storage unit and the article which are contained in the combination selected by the selector, in association with each other.

11. An information processing method executed by an information processing system comprising: a photographing device provided on a moving body; and an information processing device, the information processing method comprising:
- a photographing step configured for the photographing device to perform continuous photographing;
- a transmission step configured for the photographing device to transmit photographed images photographed by the photographing step;
- a reception step configured for the information processing device to receive the photographed images;
- a specification step configured for the information processing device, with respect to each of the photographed images received by the reception step, to specify articles and storage units in which the article is able to be stored based on a marker of the storage unit and a marker of the article which are contemporaneously photographed in the photographed image;
- an extraction step configured for the information processing device to extract a combination of the storage unit and the article stored in the storage unit every photographed image based on the articles and the storage units which are specified by the specification step;
- a selection step configured for the information processing device to select a combination of the storage unit and the article extracted by the extraction step from the photographed images that are equal to or more than a set proportion to a plurality of the set photographed images stored in the storage unit based on the articles and the storage units; and
- a memory step configured for the information processing device to store, in a memory device, information indicating the storage unit and information indicating the article, the storage unit and the article which are contained in the combination selected by the selection step, in association with each other.

12. A non-transitory computer-readable storage medium containing executable computer program code, the code comprising instructions configured to cause a processor to execute the information processing method of claim 11.

* * * * *